June 5, 1934.    C. ATWOOD    1,961,895
REAR VIEW MIRROR
Filed Sept. 30, 1932
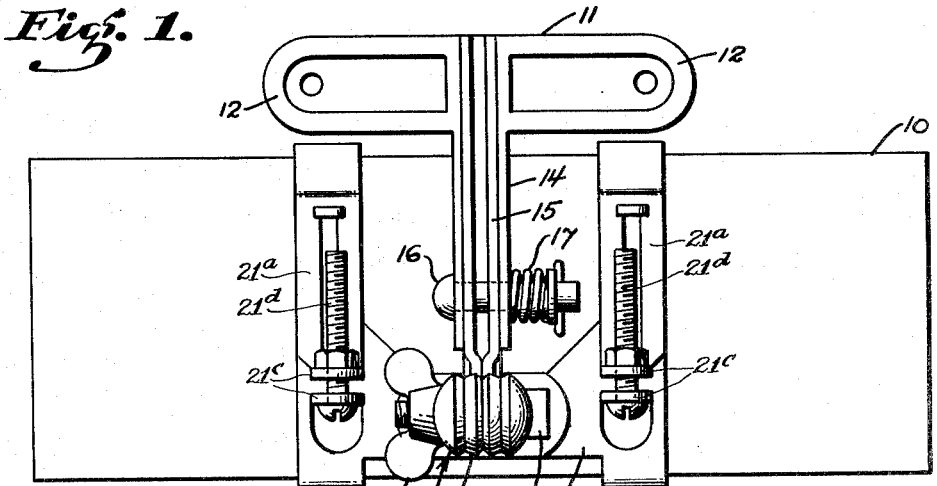
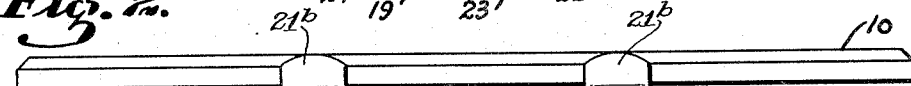
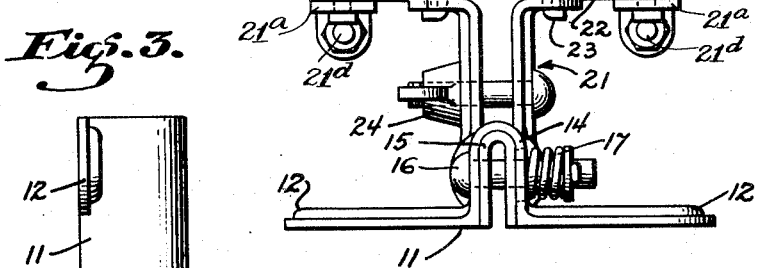
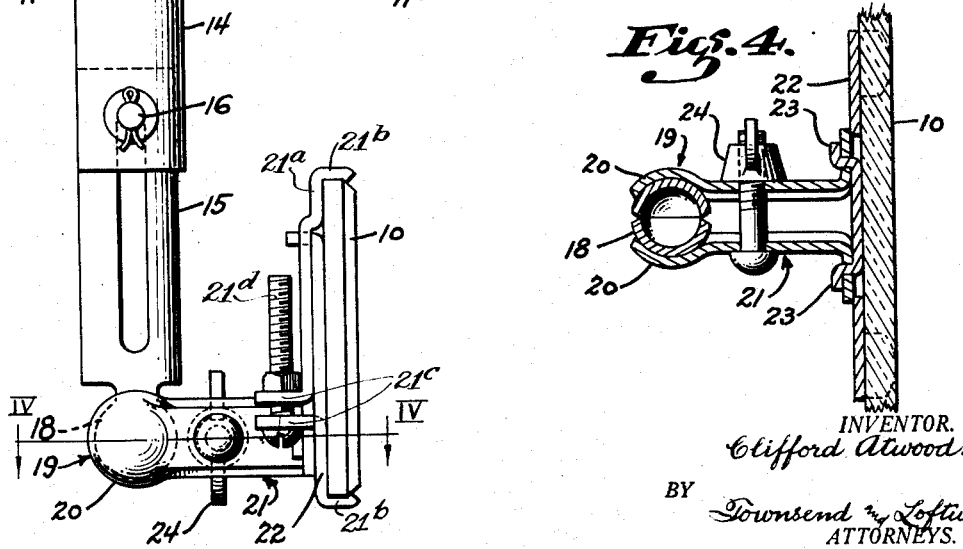
INVENTOR.
Clifford Atwood.
BY Townsend & Loftus
ATTORNEYS.

Patented June 5, 1934

1,961,895

UNITED STATES PATENT OFFICE 1,961,895

REAR VIEW MIRROR

Clifford Atwood, Oakland, Calif., assignor of one-half to Frank M. Smith, Oakland, Calif.

Application September 30, 1932, Serial No. 635,527

2 Claims. (Cl. 45—97)

This invention relates to rear sight mirrors and has for its principal object the provision of an improved mounting for rear sight mirrors which enables vertical adjustment thereof without the necessity of employing tools for effecting the adjustment, which mounting also enables universal angular adjustment of the mirror to accommodate the driver's line of vision.

In carrying the invention into practice, a stationary bracket is fixed to the sill above the windshield which is yieldably engaged by a depending member universally connected to the clamp carrying the mirror proper. This yielding engagement enables vertical adjustment of the mirror relative to the bracket without the necessity of employing any tools to effect the adjustment. The universal connection between the mirror clamp and the depending member enables universal angular adjustment of the mirror to suit the driver's line of vision.

One form which the invention may assume is exemplified in the following description and illustrated by way of example in the accompanying drawing, in which:

Fig. 1 is a view in elevation of the rear side of the mirror showing my improved mounting associated therewith.

Fig. 2 is a plan view of the mirror and its mounting.

Fig. 3 is an end view of the same with the mirror shown in lowered position.

Fig. 4 is a view in plan section taken on line IV—IV of Fig. 3.

Referring more particularly to the accompanying drawing, I have illustrated a rear sight mirror structure which includes, of course, the usual rectangular mirror 10. The mirror structure is adapted to be mounted on the cross sill above the windshield to the right of the driver's seat as in usual practice so that the driver may obtain a view through the rear window of the car.

For this purpose the rear sight mirror structure is provided with a stationary bracket 11 comprising two ears 12 adapted to be abutted against the sill and be suitably and stationarily fastened thereto. From between these two ears 12 an elongated guideway 14 depends perpendicularly. The ears and the guideway 14 are formed integral by bending a flat piece of material blanked to the proper form. Reciprocably mounted in this guideway 14 is a slide 15. The sides of the guideway 14 are slightly yielding so that they may be frictionally engaged with the adjacent surfaces of the slide 15 so as to yieldably hold the same in a set position.

To accomplish this a rivet 16 extends laterally through the guideway 14 and an expansion spring 17 is interposed between an abutment at one end of this rivet and at one side of the guideway so as to create proper frictional contact between the adjacent surfaces of the slide 15 and guideway 14. The slide 15 is slotted in register with the rivet so that it may reciprocate relative to the guideway and the rivet. The slide 15 is formed with a ball 18 at its lowermost end. The ball and slide are formed of an integral sheet of material properly blanked and formed as illustrated.

The ball portion 18 of the slide 15 is engaged by a socket 19 formed in the ends of two socket members 20. These socket members are mounted on a clamping structure 21 secured to the mirror 10. It will be seen that this clamping structure comprises a pair of two-part arms 21a having inturned ends 21b engaging opposite edges of the mirror. The arms are arranged at a spaced distance apart upon opposite sides of the center of the mirror. As mentioned, each arm is formed in two parts. The parts of each arm are formed with out turned ears 21c which are connected by a clamping screw 21d in order that the arms may be properly engaged with the mirror and held in a set position.

When the mirror is mounted in the car, the two-part arms 21a are vertically arranged and as will be seen they will be connected by a transverse section 22 lying in the same plane as the arms and against the back of the mirror. In this transverse section is formed a pair of locking lugs 23 and it is by means of these lugs that the socket members are connected to the clamping structure.

It will be seen from the drawing that each socket member is provided with a toe portion adapted to lie flush against the transverse portion of the clamping structure and a portion which extends rearwardly at right angles thereto and which terminates in the socket portion 20. The toe portion of each socket member is formed with an aperture through which the locking lugs project so that they may engage the toe portions and secure them to the clamp. The socket members are held in their proper relative position and latched to the clamping structure by means of a screw extending therebetween and fitted with a thumb nut 24. This screw and thumb nut also provide means for causing the proper amount of friction between the ball and the socket portions so that the same will be yieldably maintained in set position.

In operation of the device, it is constructed as illustrated and described and the stationary bracket is stationarily fixed to the cross sill at the top of the windshield with the guideway 14 depending perpendicularly.

If it is desired to adjust the mirror vertically, it is merely necessary to raise or lower the same relative to the stationary bracket, which movement is enabled by the yielding engagement between the guideway and the slide. Thus, a proper vertical adjustment can be obtained satisfactory to the driver to enable a full rear view to be obtained.

The ball and socket connection between the slide and the socket members, the latter of which are of course relatively fixed to the mirror clamp, enables the mirror to be adjusted in any angular position to accommodate the driver's line of vision.

The structure is made entirely of die stampings and is, therefore, comparatively inexpensive to manufacture. Likewise, it enables proper vertical adjustment of the mirror without the necessity of using tools to effect the adjustment. In order to obtain a full rear view, it is necessary that the mirror be in a low position with its surface substantially parallel to the surface of the rear window and this can only be obtained by an adjustment such as I have here provided. This mounting of the mirror enables rapid vertical adjustment of the mirror to suit different drivers.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. A mirror mounting comprising a bracket bent to form a pair of spaced downwardly extending guide members, a slide vertically movable between said guide members, a ball formed at the lower end of said slide, a mirror clamp, and a socket carried by said mirror clamp and adapted to embrace said ball to form a universal joint.

2. A mirror mounting comprising a bracket bent to form a pair of spaced downwardly extending guide members, a slide vertically movable between said guide members, a ball formed at the lower end of said slide, a mirror clamp, a socket carried by said mirror clamp and adapted to embrace said ball to form a universal joint, tension means normally resisting movement of said slide, and other tension means for adjusting the flexibility of said universal joint.

CLIFFORD ATWOOD.